United States Patent Office 2,952,679
Patented Sept. 13, 1960

2,952,679

CYANURIC ACID PREPARATION

Joseph D. Perret, Jr., Memphis, Tenn., assignor to W. R. Grace & Co., a corporation of Connecticut No Drawing. Filed Nov. 26, 1958, Ser. No. 776,438

3 Claims. (Cl. 260—248)

This invention involves a novel and improved method of preparing cyanuric acid.

Summarily the invention comprises heating urea in dipropylene glycol solvent at a temperature in the range of substantially 150°–250° C., whereby cyanuric acid is formed, and recovering the thus-formed cyanuric acid.

A brief history of the art will aid in understanding the improvements thereover by the practice of this invention.

A common method of preparing cyanuric acid is merely to fuse urea above the temperature range in which it decomposes, e.g., 190°–250° C. Fluxes or catalysts such as ammonium chloride or zinc chloride may be added thereto to increase yields as described in the Journal of the Society of Chemical Industries, vol. 67, p. 66 (1948), and in U.S. Patent No. 2,527,316, issued October 24, 1950, to Johnstone S. Mackay. However, when cyanuric acid is formed from urea by pyrolysis of the molten urea to a solid product, with or without a catalyst or flux being present, the product so formed hardens or sets up in the synthesis vessel causing severe operational difficulties. Solids first form at the heating surfaces impeding heat conductance thereby decreasing the rate of reaction ofttimes making it impossible to drive the reaction to completion even with increased reaction times. Additionally the product cake clings tenaciously to surfaces within the reactor (even glass walled surfaces) causing intermittent operation and in reality limiting the process to a batch operation. Furthermore such processes frequently yield a final product comprising no more than 60% of the desired cyanuric acid representing an uneconomical utilization of the urea feed and necessitating the employment of extensive purification procedures.

An improvement in the art embodied in German Patent No. 865,306, dated February 2, 1953, teaches the use of an inert hydrocarbon oil in which urea is maintained mechanically as a liquid-liquid suspension until reaction to a solid state occurs. The advantages of this method are that the hydrocarbon acts as a heat transfer medium thereby reducing the required time for reaction and in addition the product can be produced as small agglomerates permitting continuous removal from the reactor. The method of this patent, however, still has two disadvantages.

(1) It is almost impossible to pyrolyze the feed urea to solid cyanuric acid before the urea has had a chance to come in contact with the reactor internals. (Any such contact allows the product to grow in size and form cake wherever molten urea comes in contact with the reactor internals and necessitates operation under conditions of a low volume ratio of reactant urea to inert carrier in order to avoid frequent operational shutdowns.)

(2) The hydrocarbon medium covers the surface of the product and is entrapped within the agglomerates. The removal of this medium requires the operation of hazardous and expensive solvent extraction and recovery systems in addition to size reduction equipment.

A still further improvement in the art is claimed in U.S. Patent No. 2,822,363, dated February 4, 1958, which teaches the pyrolysis of a solution of urea or/and biuret in an inert phenolic solvent. The use of a phenolic solvent is said to eliminate the problem of caking encountered in the hydrocarbon process, but it has several disadvantages. Phenol, which has the highest degree of water solubility, has a boiling point of only 182° C. This is a temperature limit for an atmospheric process. Superatmospheric pressure equipment is costly, and super pressure can retard the course of the reaction. The reaction goes relatively slowly at 180° C. as can be seen from the cited patent, 10 hours at 180° C., compared to 3 hours above 200° C. The higher boiling phenolic solvents have poor water solubility. The examples in the patent cite the use of a benzene extraction of steam distillation to remove the phenolic solvent. In addition, the use of phenolic solvents has the disadvantages of leaving residual color bodies in the product, leaving a strong phenolic odor in the product, and entails the handling of toxic materials.

I have now found that the use of dipropylene glycol as a pyrolysis medium for urea has the required properties to overcome the aforesaid disadvantages in making cyanuric acid, namely: (1) thermal stability in the temperature range of 150° C.–250° C.; (2) chemical stability to carry out the reaction; (3) it is a urea solvent; (4) a high degree of water solubility at ambient temperatures for ease of solvent separation, extraction, and recovery; (5) a high boiling point; (6) relatively non-toxic; and (7) leaves no residual color or odor.

Preliminary runs using dipropylene glycol as a solvent disclosed the fact that considerable urea (up to one mole urea/mole dipropylene glycol) was required to saturate the solvent. When urea is put into solution by heating to just above its melting point (132.7° C.), the solvated urea can be easily recovered by salting it out with $CCl_4$. However, when heated to temperatures much above the urea melting point, the urea can no longer be salted out. As can be seen in Example 1, infra, the solubility of cyanuric acid in the reaction medium recovered from the end of the run is not sufficient to account for the urea as solvated cyanuric acid. Indications are that some of the urea feed forms a compound with the dipropylene glycol, and this compound is the actual reaction medium. Since $NH_3$ is split out in the formation of this compound, it is speculated that the actual reaction medium is a carbamate ester. Although infrared scans tend to confirm this theory, I do not wish to be bound by any theory; suffice it to say that urea will pyrolyze to cyanuric acid when heated above its melting point in a urea-saturated dipropylene glycol solvent.

The following example will aid in understanding but will not limit the invention.

Example 1

A run was made consisting of six incremental additions of urea to a two-liter resin kettle containing dipropylene glycol as solvent and equipped with a heating mantle and agitator. Quantities are given in the table below. After heating the dipropylene glycol solvent to 150° C. the first increment of urea (455 g., or about 1 mole urea per mole dipropylene glycol) was added, agitation was started, and the temperature was then raised to 200° C. during a period of about one-half hour to form the initial pyrolysis medium. The temperature was held in the range 200–230° C. (typically, 225° C.) for 1 hour, after which time the heating was discontinued. (At this point the reaction mass consists of a dispersion of cyanuric acid in the hot medium, and is ready to be recovered by conventional means, e.g., filtration, centrifugation, etc. If desired, for ease of handling, the hot dispersion may be allowed to cool somewhat before separating the cyanuric acid.) When the temperature fell to 150° C. agitation was discontinued and the contents of the resin kettle were passed to a filter, the filtrate solvent therefrom being returned to the resin kettle forthwith, or sent to a storage vessel for subsequent return to the resin kettle as needed for volume makeup. The "moist" filter case containing the cyanuric acid product was transferred to an open agitated vessel and slurried with water to obtain about a 35% solids slurry. The thus-made slurry was then transferred to a second filter wherefrom the resulting filter case product was passed to a drier to remove residual moisture, then weighed and analyzed. The filtrate from the aforementioned second filter consisting of water and residual solvent was transferred to an evaporator wherein the water was boiled off. Residual dipropylene glycol solvent was returned to the resin kettle or a storage vessel therefor.

The next increment of urea was then added and the procedure as outlined above was repeated until all six increments of urea had been added. The solvent recovery system was operated intermittently and some fresh solvent was added during the run to make up the volume. The complete operation was as follows:

| Increment No. | Urea Added (gms.) | Fresh Dipropylene Glycol added (cc.) | Recovered Solvent (cc.) | Recovered Solvent added to kettle (cc.) | Product Recovered (gms.) |
|---|---|---|---|---|---|
| 1 | 455 | 1000 | 400 | 0 | 63.5 |
| 2 | 1000 | 0 | | 0 | 586.7 |
| 3 | 1000 | 250 | 590 | 0 | 554.0 |
| 4 | 1000 | 250 | | 0 | 677.0 |
| 5 | 1000 | 0 | 855 | 400 | 697.0 |
| 6 | 1000 | 0 | | 590 | 689.0 |
| | 5455 | | | | 3267.2 |
| Recovered from final filtrate on cooling | | | | | 49.7 |
| Total Product | | | | | 3316.9 |

The product composition was as follows; 86.1% cyanuric acid, 12.5% ammelide and 1.4% residual solvent and moisture. On this basis the yield of cyanuric acid was:

$$\frac{3316.9 \times 86.1 \times 1.395}{5455} = 73.03\% \text{ of theory}$$

If desired, the crude product may be purified. For example, after treatment with dilute acid (to hydrolyze ammelide impurity to cyanuric acid), filtration, and washing, the product weighed 3285 grams and analyzed 99.5% cyanuric acid and 0.5% residual moisture. The yield after hydrolysis was:

$$\frac{3285 \times 99.5 \times 1.395}{5455} = 83.6\% \text{ of theory}$$

1500 cc. of dipropylene glycol was used in the run, of which 230 cc. were recovered from the off gas stream. The urea required to "saturate" the remaining 1270 cc. of solvent was 578 grams. Allowing for the urea required to "saturate" the solvent, the steady state yield prior to purification was:

$$\frac{3316.9 \times 86.1 \times 1.395}{5455 - 578} = 81.6\% \text{ of theory}$$

Allowing for the urea required to saturate the dipropylene glycol solvent, the yield after purification by hydrolysis with mineral acid was 93.6% of theory:

$$\frac{3285 \times 99.5 \times 1.395}{4877} = 93.6\% \text{ of theory}$$

It is obvious to those skilled in the art that various modifications of the process step can be adapted without digressing from the scope of the invention. For example, in Example 1, it is within the scope of the process to provide a plurality of vessels for the steps therein described and thereby provide a continuous process by alternative use of such vessels. Furthermore, substitutions of equipment such as centrifuges or other well-known liquid solid separators for the filters of Example 1 are operable and within the scope of this invention.

For practical reasons, it is preferred to carry out the pyrolysis at atmospheric pressure. However, sub- or superatmospheric pressure may be used. Obviously, for temperatures above the boiling point of dipropylene glycol, the pyrolysis step must be carried out using superatmospheric pressure.

As cyanuric acid has a perceptible vapor pressure above 200° C. and dipropylene glycol has a boiling point of 231.8° C. at atmospheric pressure, it is preferred that the pyrolysis be performed at temperatures of about 200–230° C.

The feed urea can be added to the solvent in solid or molten form within the scope of this invention. Nor is it critical that the urea added be pure; in fact the urea feed may, if desired, be partially pyrolyzed to a material containing substantial percentages of biuret and/or cyanuric acid.

If desired, catalysts or additives disclosed in the prior art such as zinc chloride or ammonium chloride can be added to the reaction medium to increase the yield further. However, since the conversion of urea to cyanuric acid using dipropylene glycol alone is unusually high, the effect of such additives (on the yield) may not be as beneficial in the instant process as in the prior art processes that did not use dipropylene glycol.

I claim:
1. In the method of making cyanuric acid by pyrolyzing urea in an inert diluent in a pyrolysis vessel at a temperature in the range of about 150–230° C. and atmospheric pressure and then washing the diluent from the cyanuric acid with water, the improvement in which the pyrolysis is carried out for a time not exceeding one hour in a diluent initially prepared by heating together urea and dipropylene glycol in a mole ratio of about 1:1 at a temperature of 150–200° C.

2. The method according to claim 1 that comprises filtering the cyanuric acid from the diluent and returning the filtrate to the pyrolysis vessel.

3. The method according to claim 2, in which, after the filtered cyanuric acid is washed with water, the water is evaporated from the filtrate to recover the diluent, and the thus-recovered diluent is returned to the pyrolysis vessel.

References Cited in the file of this patent
UNITED STATES PATENTS

| 2,871,259 | Levy | Jan. 27, 1959 |
| 2,872,447 | Oehlschaeger | Feb. 3, 1959 |

FOREIGN PATENTS

| 506,070 | Canada | Sept. 28, 1954 |
| 753,127 | Germany | Nov. 24, 1952 |
| 865,306 | Germany | Feb. 2, 1953 |

OTHER REFERENCES

Hofmann: Deut. Chem. Gesell., Berichte, vol. 4, p. 267 (1871).